June 20, 1944.　　　　J. H. DERBY　　　　2,351,587
ALARM CIRCUIT
Original Filed Aug. 3, 1937
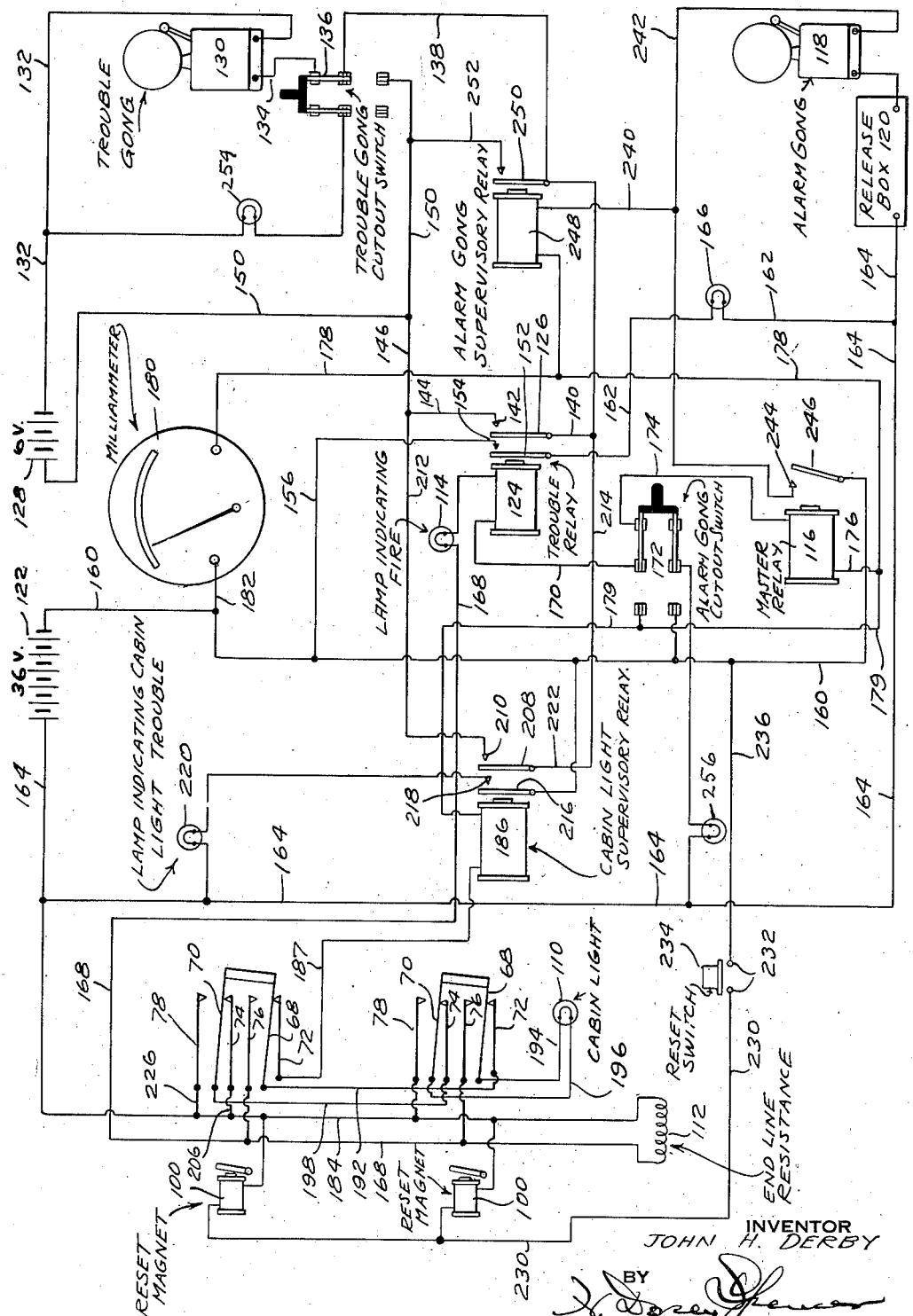
INVENTOR
JOHN H. DERBY
BY
ATTORNEY Patented June 20, 1944

2,351,587

UNITED STATES PATENT OFFICE 2,351,587

ALARM CIRCUITS

John H. Derby, Scarsdale, N. Y.

Original application August 3, 1937, Serial No. 157,105. Divided and this application June 26, 1940, Serial No. 342,445

3 Claims. (Cl. 177—355)

This invention relates to thermostatically controlled fire alarm or fire control systems.

Thermostatic circuit controlling devices for the aforementioned purposes are of two general types: Those operating upon a rise of temperature above a predetermined maximum and those operating when the temperature rises at a certain rate, the latter type being commonly referred to as rate-of-rise thermostats. Some advantages attach to the use of each of these two types of thermostatic circuit controlling devices, depending upon the place of use. For example, rate-of-rise systems, if not combined with some means for insuring their operation when the temperature reaches a predetermined maximum, do not always detect dangerous increases in temperature, if these increases have been slow or gradual. Furthermore, these systems sometimes give false alarms for sudden increases in temperature which are not associated with dangerous conditions; for example, an updraft of hot air resulting from the removal of the cover from a kettle of boiling water or the opening of a door between two rooms of markedly different temperatures.

Ideal protection, therefore, usually demands the combination of thermostatic means operating on the rate-of-rise principle with thermostatic means operating when the temperature exceeds a predetermined maximum so that both the quick rise in temperature which is dangerous can be detected and also the more slow but often equally dangerous rise in temperature beyond a predetermined maximum.

Many thermostatic circuit controlling systems, both those that operate on the rate-of-rise principle and those that operate when the temperature rises above a predetermined maximum are constructed so that they are automatically reset. There are some advantages in this, in that the system is always ready to operate.

But automatic resetting also has its disadvantages, particularly where there is no intermediate mechanically or electrically driven signal transmitting means set in operation by the thermostat. If, for example, a fire starts where there is a rate-of-rise system without the intermediate, independently operated signal transmitting means and the fire smolders without further increase in the room temperature, then the system, after giving an initial alarm, may adjust itself to the constant temperature and cease to give an alarm, leading a distant attendant to believe that there was no fire or that it has been extinguished. Likewise with thermostatic controlling devices operating on the principle of a rise of the temperature above a predetermined maximum, in the absence of intermediate, independently driven signal transmitting means, the falling of the temperature in the neighborhood of the thermostat may not necessarily indicate that the fire has been completely taken care of and yet the thermostat may reset itself and thus fail to continue to give an alarm. It is therefore frequently advisable to provide that the thermostatically actuated circuit controlling means, when operated, remain in operative alarm-sending condition until manually reset, in order to place upon the one who resets the alarm the responsibility for an inspection of the place from which the alarm was sent has been made before such resetting.

One of the objects of the present invention is to provide for the maintenance of the operative circuit to the alarm or other signal system, when completed by the action of the thermostat, until the attendant effects the resetting of the controlling means, thus placing upon him the responsibility for having done something to insure himself that there is no further occasion for alarm. At the same time the invention provides for the simple and convenient resetting of the thermostatic circuit controlling means into condition for operation again when the occasion demands.

Another important feature of the invention is the arrangement of the parts of the thermostatically actuated circuit controlling mechanism so that they can readily be automatically supervised.

Other objects and important features of the invention will appear from the following description and claims when considered in connection with the accompanying drawing.

In the drawing the figure is a wiring diagram of fire alarm and supervisory circuits including groups of the thermostatically actuated circuit controlling devices of the present invention, the illustrated circuit arrangement being particularly designed for use on ships.

In the figure is shown a wiring diagram illustrating the application of the invention to fire prevention on ships. In this diagram there is provided only a single cabin light signal 110 for each of a plurality of cabins on a short corridor, it being intended that the cabin light 110, indicating the location of the fire, be located at the junction of the short corridor, on which the cabins are located, with the usual long corridor. Furthermore, for convenience in following the circuits the wiring diagram shows the switches and resetting mechanism for only two of the thermostatically actuated circuit controlling devices associated with the cabin light 110.

The figure shows a thermostatically-controlled fire alarm circuit of the type in which a resistance 112 in parallel with the thermostatically actuated circuit controllers maintains the flow of current through the alarm circuit below the operating level of the fire signal lamp 114 or of the master relay 116 which controls the alarm gong 118 and any suitable release device 120 for releasing the extinguishing medium, such, for example, as water into a dry pipe system, or "foamite" or carbon dioxide. See, for example, the release box disclosed in my U. S. Letters Patent No. 1,187,135, granted June 13, 1916. The current permitted by the resistance 112 to flow through the alarm circuit from the source of supply 122 is, however, sufficient to energize a trouble relay magnet 124 to such an extent as to maintain the armature 126, constituting one member of a switch in a local trouble alarm circuit including an independent source of current 128, in open switch condition in the absence of a break in the circuit.

The local trouble alarm circuit comprises a trouble gong 130 connected to one side 132 of the local circuit and through wire 134, throw switch 136, wire 138, wire 140, armature 126, contact 142, wires 144, 146 back to the other side 150 of the local circuit.

Another armature switch member 152, also controlled by the trouble relay magnet 124, serves to close a circuit through the other source of current 122 when the trouble relay magnet 124 is deenergized, this other circuit comprising the contact 154, wire 156, to one main 160 from the source 122 and the wire 162 from the other main 164 from the source 122 through the trouble light 166 back to the armature switch member 152.

The main alarm circuit hereinabove referred to, which has at the end of the line, in parallel with the thermostatically actuated circuit controllers, the resistance 112 maintaining the current flow in the alarm circuit below alarm operating level but still sufficiently high to energize the trouble relay magnet 124, comprises the wire 168 running through the fire signal lamp 114 to the trouble relay magnet 124. From the trouble relay magnet 124 a wire 170 goes to switch 172, from which wire 174 runs to the master relay 116. From the master relay 116 wire 176 is connected through wire 178 to the milliammeter 180, and then through wire 182 to the main 160 from the source of current supply 122. The other wire 184 from the other side of the resistance 112 goes directly to the other main 164 from the source of supply 122.

It will be seen that when any thermostatically actuated circuit closer is moved to its circuit energizing position the switch members will short circuit the resistance 112, thus permitting an increase of the current in the circuit to the fire alarm lamp 114 and the master relay 116 sufficient to operate these two forms of fire alarm. The manner in which the resistance 112 is short circuited is as follows:

The switch member 76, which is normally in open circuit position, is connected to the side 168 of the resistance circuit and the switch member 78 is connected to the side 184. The switch members 68 and 70 are insulated from each other.

When the switch members 68 and 70 move up into engagement respectively with the switch members 76 and 78, due to high or rising temperatures, for example in the manner described in my prior copending application Serial No. 157,105 which issued as Patent No. 2,209,193, granted July 23, 1940, of which this application is a division, there is effected a short-circuiting of the resistance 112 and a raising of the current flow to alarm actuating level.

When, however, the parts are in the position shown in the drawing, that is, with the switch member 68 in engagement with the switch member 72 and the switch member 70 in engagement with the switch member 74, there being a plurality of these thermostatic circuit controllers associated with each cabin light 110, a mere supervisory circuit is established as follows:

Current from the main 160 leading from the source of current supply 122 goes through the wire 182 to milliammeter 180, through the wire 178 from the milliammeter, through the wire 179 cabin light trouble relay magnet 186 through wire 187 to the switch member 72 of the upper one of the thermostatic circuit closers shown, then through the switch member 68 to the connection 188 to the switch member 72 of the next thermostatic circuit closer, through switch member 68 of the second circuit closer and through the wire 194 to the cabin light 110 associated with this group of circuit closers. From the cabin light the supervisory current flows through the wire 196 to the switch member 70 of the lower circuit closer of this group, through the switch member 74 of this circuit closer to the connection 198 to the switch member 70 of the upper circuit closer, through the switch member 74 of the upper circuit closer to a connection 206 to the wire 184 of the controller circuit and then back to the main 164 from the source of current 122. Thus through the movable switch members 68 and 70 and the stationary members 72 and 74 of the circuit closers there is maintained a supervisory current kept below signal operating level by the resistance of the trouble relay magnet 186 but yet sufficiently strong to energize said magnet 186 and thus hold open the two trouble alarm circuits controlled thereby.

One of the trouble alarm circuits controlled by magnet 186 comprises the movable switch member 208 held normally in open circuit relation to the stationary switch member 210 by the supervisory current flowing through the magnet 186. The stationary switch member 210 is connected through wire 212, wire 146 to the main 150 from the auxiliary source of current supply 128 and the movable switch member 208 is connected through wire 214, wire 138, wire 134 and trouble gong 130 to the other main 132 from the auxiliary source of current supply 128.

The outer trouble alarm circuit controlled by the magnet 186 comprises the movable switch member 216 held by the magnet 186 normally in open circuit relation to the stationary switch member 218 which is connected through the trouble light 220 to the main 164 from the main source of current supply 122. The movable switch member 216 is connected through the wire 222 to the other main 160 from the source of current supply 122.

As hereinabove stated, when any one of the thermostatic circuit controlling units of a set is operated e. g. in the manner shown and described in my prior Patent No. 2,209,193, granted July 23, 1940, the switch members 68 and 70 move up into engagement respectively with the switch members 76 and 78, and there is effected a short circuiting of the resistance 112 and a raising of the current flow to alarm actuating level. This short circuiting of the resistance 112 takes place as follows:

Assuming that the circuit controller which has been actuated to effect the short circuiting of the resistance 112 is the uppermost one of the group shown in the drawing, then the current, taking the course of least resistance, will flow through the connection 226 from the side 134 of the resistance circuit to the switch member 78, then through the switch member 70 and the connecting wire 198 to the switch member 74 of the next thermostatic circuit closer through the switch member 70 of this second thermostatic circuit closer and the wire 196 to the cabin light 110, then through the wire 194 to the switch member 68 of the lower circuit closer through the switch member 72 of this circuit closer to the wire 188 connected to the switch member 68 of the circuit closer that has been operated and then through the switch member 76 of the operated circuit closer and wire 228 to the other side 168 of the resistance circuit, thus short circuiting the resistance 112 through the aforedescribed low resistance shunt which includes the local signal, namely cabin light 110.

In a similar manner each thermostatic circuit closer, when operated while the other or others remain unoperated, will effect a short circuiting of the resistance 112 and thus a raising of the current level sufficiently to operate the signal light 114, the master relay 116 which closes the circuit to the alarm gong 118, and the release mechanism 120 which may operate any suitable automatic fire extinguishing system such as a valve admitting water to a dry pipe system, a "foamite" release mechanism, etc.

The resetting magnets 100 are arranged in parallel in a circuit which comprises the wire 184 connected to the main 164 and a second wire 230 leading to the stationary member 232 of a normally open switch 234 which is connected by wire 236 to the other main 160. When the operator at the central station closes the switch 234, 232 all of the magnets 100 are energized simultaneously. Of course this has resetting effect only on those thermostatic circuit closers which are not in set condition, the armatures 102 being free to move only when the thermostatically actuated circuit controllers are in actuated position.

Although the normally open alarm gong circuit is a local circuit at the central board and is not apt to get out of order, it can readily be supervised, as shown, by providing a shunt 240 from the wire 242, which leads from one side of the gong 118 to the contact 244 of the normally open switch 246, this shunt 240 going through a supervisory relay magnet 248 to the wire 178 leading through the milliammeter and wire 182 to the side 160 of the circuit from the main source of current supply 122. The supervisory relay 248 has sufficient resistance to maintain the supervisory current, in the circuit thus established through the alarm gong, below gong operating level. The current, however, will be sufficient to hold open an operating circuit through the trouble gong by holding back the armature 250 which, when released, will close a trouble gong circuit through the wire 252 which is connected to the wire 150 on one side of the current supply 128, the armature 250 being connected to the wire 138 which, as hereinabove described, is in turn connected to the other side 132 of the trouble gong circuit.

Only two thermostatically operated circuit closers for short circuiting the resistance 112 have been shown and described. It will be understood, however, that the cabin light 110 may provide the local alarm or locating signal for more than two cabins each provided with a thermostatic circuit closer, all included in the supervisory circuit. It will also be understood that a plurality of cabin lights 110, each representing a group of cabins, can, without changing the invention in any way, be introduced into both the supervisory and the signal operating circuits by simply multiplying the connections illustrated.

There may be occasions when it is desired to cut out the trouble gong circuit. For this purpose the switch 136 is provided. In order to give the supervisor of the local board warning that the trouble gong circuit has been cut out a signal lamp 254 is lighted when the switch 136 is moved to its other position. Similarly, it may be desirable at times to cut out the alarm gong. This can be done by moving the switch 172 to its other position. To give the supervisor of the switchboard warning that the alarm gong circuit has been cut out a lamp 256 is provided which is lighted when the switch 172 is moved to its cutout position.

What is claimed as new is:

1. In a fire alarm system, a normally closed main signal circuit comprising electrically operable signal means, a source of electric current, a trouble relay magnet and resistance sufficient to maintain the current flow in said circuit below signal operating level but high enough to energize the trouble relay magnet, a normally closed local signal circuit also connected to said source of electric current and comprising a local signal and a trouble relay magnet, said local circuit having therein resistance sufficient to maintain the current flow in said circuit below the operating level for said local signal but high enough to keep the trouble relay magnet energized, a two-way switch and connections between said switch and said main and local circuits whereby movement thereof from one position to the other establishes a local signal operating shunt across the resistance in the local signal circuit and establishes said local circuit in signal operating shunt relation to the resistance in the main signal circuit.

2. A fire alarm system according to claim 1 in which the resistance in the local signal circuit is constituted by the winding of the trouble relay magnet in said circuit.

3. A fire alarm system according to claim 1 in which the local signal circuit includes a plurality of two-way switches connected in series for supervision by the supervisory current flowing therethrough when the switches are in one position but each having an independent shunt connection to the main signal circuit in its other position.

JOHN H. DERBY.